(12) United States Patent
Kikinis

(10) Patent No.: US 7,389,523 B2
(45) Date of Patent: Jun. 17, 2008

(54) METHOD AND SYSTEM FOR INSERTING A NEW CHANNEL INTO A LIST OF PREFERRED CHANNELS

(75) Inventor: Dan Kikinis, Saratoga, CA (US)

(73) Assignee: JLB Ventures, LLC, Washington, DC (US)

( * ) Notice: Subject to any disclaimer, the term of this patent is extended or adjusted under 35 U.S.C. 154(b) by 1027 days.

(21) Appl. No.: 10/029,508

(22) Filed: Oct. 19, 2001

(65) Prior Publication Data

US 2002/0083452 A1 Jun. 27, 2002

Related U.S. Application Data

(60) Provisional application No. 60/242,011, filed on Oct. 19, 2000.

(51) Int. Cl.
H04N 5/445 (2006.01)
H04N 7/173 (2006.01)
H04N 7/16 (2006.01)

(52) U.S. Cl. .................... 725/46; 725/49; 725/131; 725/139; 725/151

(58) Field of Classification Search ............ 725/46, 725/49, 131, 139, 151
See application file for complete search history.

(56) References Cited

U.S. PATENT DOCUMENTS

| 5,414,773 | A | 5/1995 | Handelman |
|---|---|---|---|
| 5,479,268 | A | 12/1995 | Young et al. |
| 5,532,754 | A | 7/1996 | Young et al. |
| 5,737,028 | A | 4/1998 | Bertram et al. |
| 5,751,282 | A | 5/1998 | Girard et al. |
| 5,818,441 | A | 10/1998 | Throckmorton et al. |
| 5,841,563 | A | 11/1998 | Effenberger |
| 5,900,915 | A | 5/1999 | Morrison |
| 5,926,168 | A | 7/1999 | Fan |
| 5,956,456 | A | 9/1999 | Bang et al. |
| 5,999,167 | A | 12/1999 | Marsh et al. |
| 6,029,045 | A * | 2/2000 | Picco et al. .................... 725/34 |
| 6,029,195 | A | 2/2000 | Herz |
| 6,075,575 | A | 6/2000 | Schein et al. |
| 6,167,188 | A | 12/2000 | Young et al. |
| 6,205,485 | B1 | 3/2001 | Kikinis |
| 6,233,389 | B1 | 5/2001 | Barton et al. |
| 6,271,831 | B1 | 8/2001 | Escobosa et al. |
| 6,357,042 | B2 * | 3/2002 | Srinivasan et al. ............ 725/32 |
| 6,373,528 | B1 * | 4/2002 | Bennington et al. ........ 348/569 |
| 6,993,782 | B1 * | 1/2006 | Newberry et al. ............ 725/39 |

FOREIGN PATENT DOCUMENTS

WO  WO 00/01149 A1  1/2000

* cited by examiner

*Primary Examiner*—Kieu-Oanh Bui
(74) *Attorney, Agent, or Firm*—Banner & Witcoff, Ltd.

(57) ABSTRACT

A first set of channels is provided. The first set of channels is selected based on a predetermined criteria related to a viewing preference of a viewer. A first channel not selected based on the predetermined criteria related to the viewing preference of the viewer is inserted into the first set of channels. In one embodiment, a system operator inserts the first channel into the first set of channels. In one embodiment, insertion is disallowed if a number of channels not selected based on the predetermined criteria related to the viewing preference of the viewer that have been inserted into the first set of channels is greater than a predetermined number.

20 Claims, 5 Drawing Sheets

METHOD AND SYSTEM FOR INSERTING A NEW CHANNEL INTO A LIST OF PREFERRED CHANNELS

RELATED APPLICATIONS

The present application claims priority to the provisional filed application entitled Inserting a "Cuckoo" Channel into a List of Channel Favorites, filed on Oct. 19, 2000, Ser. No. 60/242,011, which is also incorporated by referenced herein. This application is related to the co-pending application entitled Method and Apparatus for Generation of a Preferred Broadcasted Programs List, filed on Oct. 19, 2001, Ser. No. 10/029,784, which claims priority to the provisional application entitled Dynamic, Automatic Generation of Favorite Times and Channel List, filed on Oct. 19, 2000, Ser. No. 60/241,880.

FIELD OF THE INVENTION

The invention relates to the field of data processing. More specifically, the invention relates to processing data relating to television viewing preferences.

BACKGROUND OF THE INVENTION

Very often program providers deliberately make the set up and maintenance of preferred channel lists inconvenient, requiring arcane programming, etc., because program providers are afraid they may be unable to push new channels into the market if people are given a simple, convenient way to select only the programs they like and thus ignore new channels coming to market. Such a convenience for viewers would make it more difficult for program providers to introduce new channels and programs into the market.

As a result, preferred channel lists are, to a certain degree, made inconvenient to create and use and are not emphasized a lot, because there is, for program providers, an inherent conflict between providing a good method for generating and using a preferred channel list and having the ability to push new content.

SUMMARY OF THE INVENTION

A first set of channels is provided. The first set of channels is selected based on a predetermined criteria related to a viewing preference of a viewer. A first channel not selected based on the predetermined criteria related to the viewing preference of the viewer is inserted into the first set of channels. In one embodiment, a system operator inserts the first channel into the first set of channels. In one embodiment, insertion is disallowed if a number of channels not selected based on the predetermined criteria related to the viewing preference of the viewer that have been inserted into the first set of channels is greater than a predetermined number.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
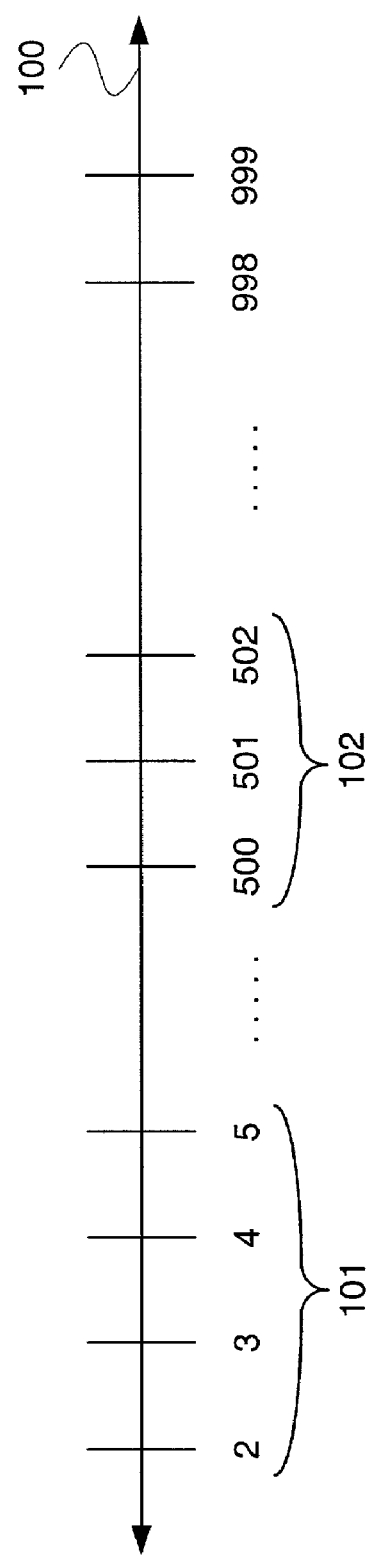
FIG. 1 illustrates a typical channel lineup available on a television organized into clusters of channels according to one embodiment.

FIG. 1 illustrates a typical channel lineup available on a television organized into clusters of channels according to one embodiment. The spectrum 100 of available channels is shown as a line. In digital cable systems there is a cluster of local broadcast channels at the lowest available channel number, which is typically channel 2.

Ultrahigh frequency ("UHF") stations that desire to be placed in a channel slot that is more frequently selected may vie for gaps in the air programming space at this lowest end of the channel lineup. Those vied-for channels typically start at channel 2 and extend to some other channel approximately in the range of 20 to 25. Often UHF channels somewhere around channel 36 or 44, for example, are, on cable, inserted at channel numbers as low as channel 5 or 6, for example. Sometimes broadcasters pay cable companies a placement fee to be at inserted at a lower channel number. Channels 2, 3, 4, and 5 are shown on spectrum 100 in a cluster 101 of expensive channels.

This practice originated because when early televisions and set top boxes were turned on, they initially displayed channel 2, and the viewer would then surf upward (numerically) through the channels. The presumed assumption was that the closer a channel was to the channel number initially offered when the TV was turned on, the better the chance was that the viewer would surf to the channel.

When, later, vast numbers of premium channels were added, they were issued some arbitrary starting channel number, for example channel 500, and then started from there. Again, a similar issue of favorable positioning arose. Channels 500, 501, and 502 are shown on spectrum 100 in a cluster 102 of premium channels.

Figure 2:
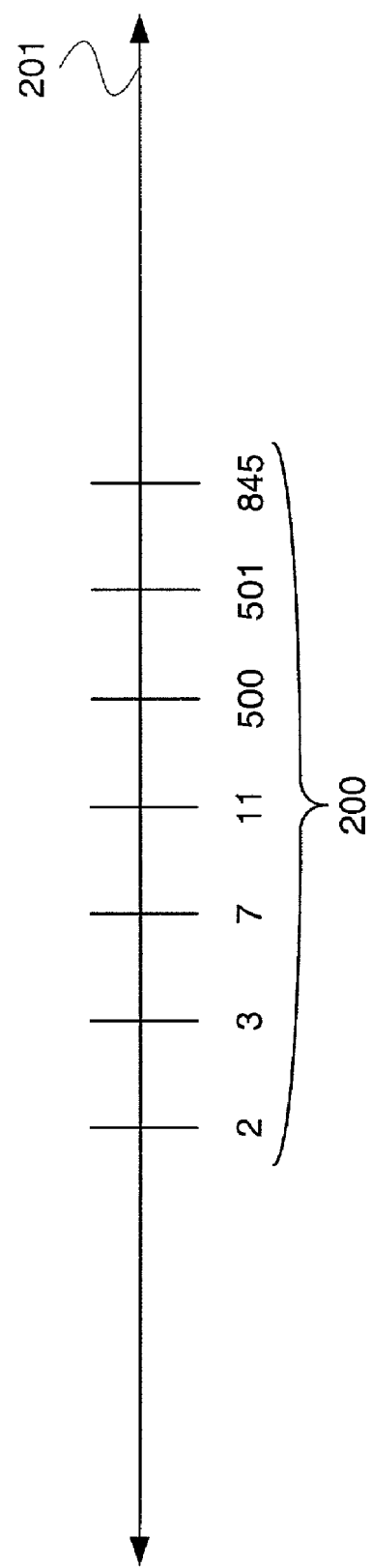
FIG. 2 illustrates a list of preferred channels of a viewer according to one embodiment.

FIG. 2 illustrates a list of preferred channels of a viewer according to one embodiment. Preferred channel list 200 lists channels 2, 4, 7, 11, 500, 501, and 845 as the preferred channels of the user on spectrum 201. These channels are selected based on predetermined criteria related to the viewing preference of the viewer. In one embodiment, the predetermined criteria includes channel numbers. In one embodiment, the predetermined criteria includes viewing times. In one embodiment, the predetermined criteria includes subject matter. In one embodiment, the preferred channel list contains channels manually selected by the viewer. In one embodiment, the preferred channel list contains channels which are frequently selected by a viewer. The frequency may be a predetermined amount. In one embodiment, the preferred channel list contains channels which the viewer watches for the longest period of time. The minimum period of time may be a predetermined amount. These predetermined amount may be specified by the viewer in one embodiment, or by a system operator (such as a cable provider) in one embodiment. In one embodiment, the preferred channel list is shown on a television display. In one embodiment, the preferred channel list may be accessed and changed by a viewer by pressing buttons on a remote control or on a set-top box or on a television itself. The preferred channel list may be navigable in one embodiment through a series of menus.

Figure 3:
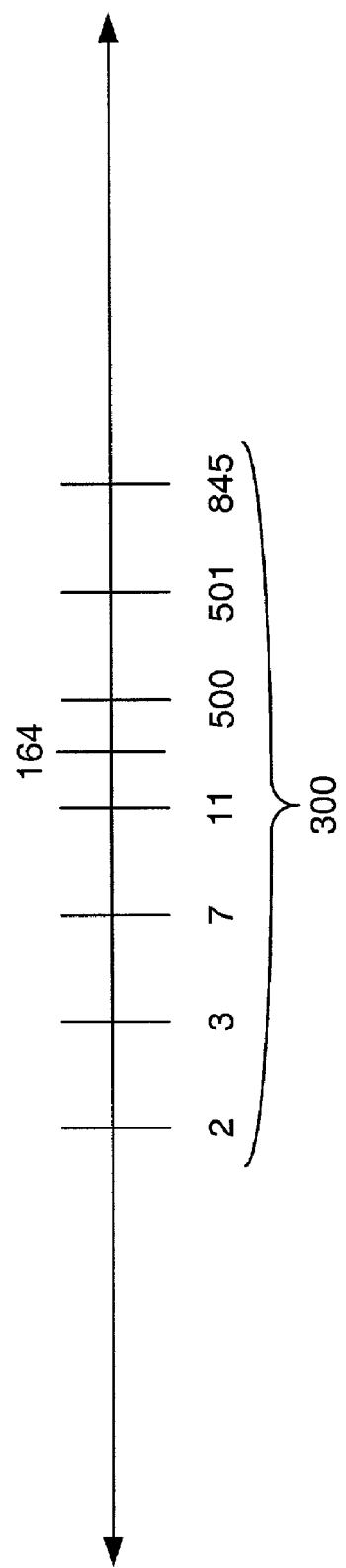
FIG. 3 illustrates a viewer's preferred channel list according to one embodiment.

FIG. 3 illustrates a viewer's preferred channel list according to one embodiment. Channel 164 is a channel to be included in the viewer's preferred channel list but not selected based on the predetermined criteria related to the viewing preference of the viewer that, in one embodiment, the system operator inserts into the viewer's preferred channel list 300. Such a channel may be inserted, in one embodiment, for a limited period (for example, for a week, a month, or any other desired period) as a promotion, and certain restrictions may apply to the insertion of the channel. In one embodiment, the media provider or cable programmer is not permitted to insert a number of channels greater than some predetermined threshold (for example, 10 percent) of the preferred channels in the viewer's list. Therefore, in one embodiment, insertion is disallowed if a number of channels not selected based on the predetermined criteria related to the viewing preference of the viewer that have been inserted into the first set of channels is greater than a predetermined number. This predetermined number is in one embodiment selected by a system operator such as a cable provider. The predetermined number may in another embodiment be selected by a viewer.

As insertions can allow new programs to be promoted, there may be value in those inserted channel opportunities for new networks to enter aggressively into the market. Also, the cable company can use such insertions to promote its own programs on occasion, such as special events, season premieres etc., by inserting a preview channel for a special event on a specific day or a week, etc.

Figure 4:
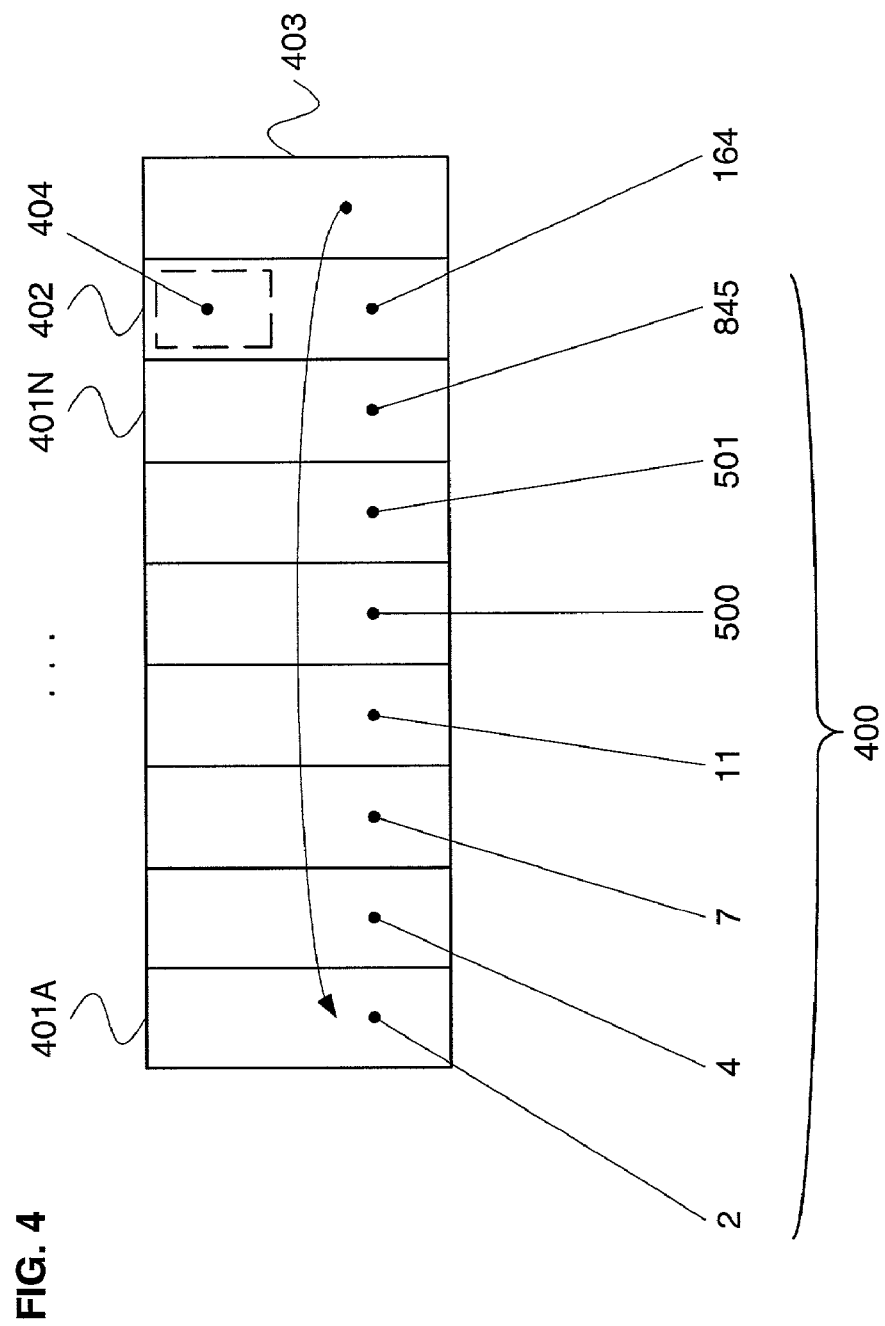
FIG. 4 illustrates a table that presents preferred channel lists according to one embodiment.

FIG. 4 illustrates a table that presents preferred channel lists according to one embodiment. It shows a lineup with pointers for the preferred channel list 400. In one embodiment, the end-of-list segment 403 points back to the initial channel segment, to allow continuous browsing of the list. In one embodiment, table segments 401A through 401N are standard channel listings, whereas table segment 402 is a listing for a channel not selected based on the predetermined criteria related to the viewing preference of the viewer, as inserted in the preferred channel listing in FIG. 3.

In one embodiment, also included in segment 402 is a date limit 404, causing the listing to expire once that date limit has been reached. Such a time limit could be specific down to hours or even seconds, in cases of promotions of the type of, for example, a special boxing fight on a popular premium channel. In such cases, the program provider could insert a special promotion channel that expires when the fight begins or ends. Upon expiration, the expired channel is in one embodiment removed from the preferred channels list.

The commands that insert segment 402 into a preferred channels list could be broadcast by the system operator into all recipient devices (for example, cable boxes, set-top boxes, integrated intelligent televisions, etc.). In one embodiment, the command is a tag or element or object that is recognized by the electronic programming guide ("EPG") or interactive programming guide ("IPG") and is accordingly processed and causes a software engine to insert a new channel into the preferred channel list in the correct location as set forth above.

Figure 5:
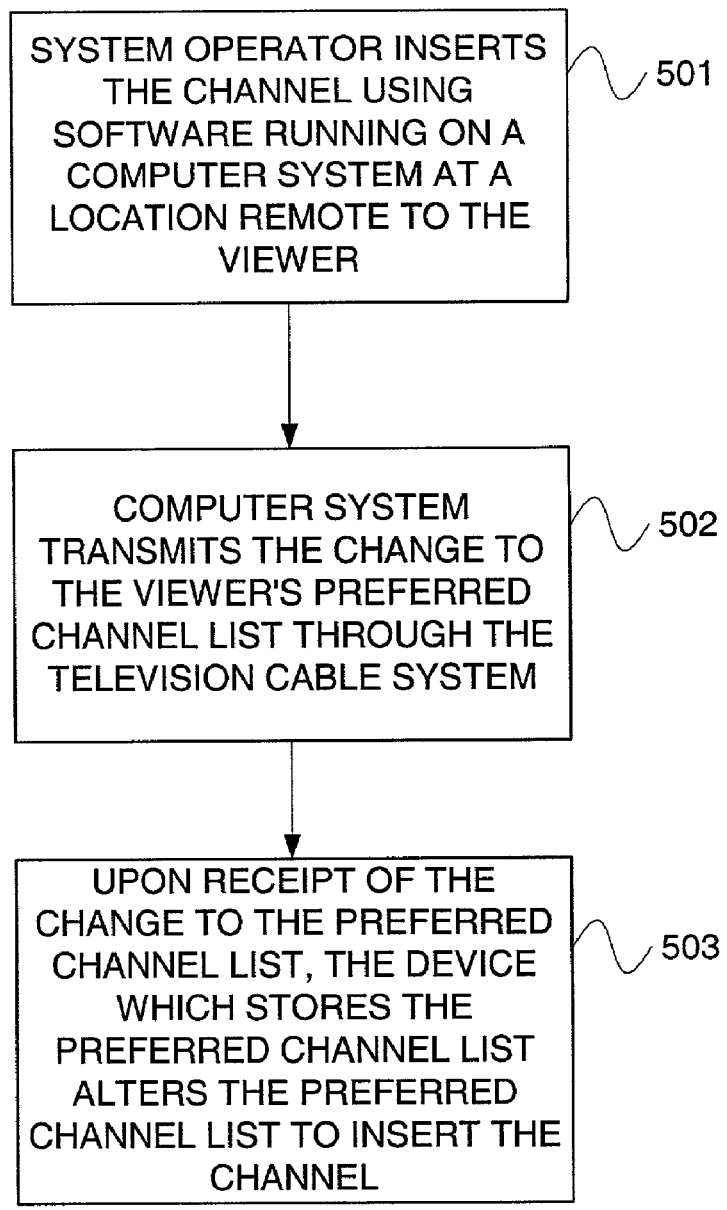
FIG. 5 illustrates a process for inserting a channel into a viewer's preferred channels list according to one embodiment.

FIG. 5 is a flow diagram illustrating a process for inserting a channel into a viewer's preferred channels list according to one embodiment. In process block 501, a system operator (for example, a cable provider, a satellite provider, etc.) may insert the channel using software running on a computer system at a location remote to the viewer. In process block 502, the computer system would then transmit (for example, through the television cable system coupled with the computer system, or through the air in the case of a satellite system, etc.) the change to the viewer's preferred channel list. The change in one embodiment is in the form of a command understandable by a recipient device to alter the viewer's preferred channel list. The viewer's preferred channel list is in one embodiment stored in a set-top box which interfaces with the media system (for example, the cable system, the satellite system, etc.). In one embodiment, the viewer's preferred channel list is stored in a television which interfaces with the media system. In process block 503, upon receipt of the change to the preferred channel list, the device which stores the preferred channel list (e.g., a set-top box, a television, etc.) alters the preferred channel list to insert the channel. Of course, other systems besides cable systems may be used also. Some of these other systems include satellite systems, telephone systems, and internet systems.

In one embodiment, the software could be programmed to restrict the number of such special segments, according to the number of standard segments in the preferred channel list.

As an additional option, in one embodiment viewers could be given the opportunity to have channels inserted in their preferred channels list that are selected from a set of the channels with at least a predetermined occurrence in the preferred channels lists of all other viewers in the viewer's geographic location, such as the viewer's city or state, or are channels are selected from a set of channels that typically concentrate on particular topics of interest, such as nature, crime and police, comedy, etc.

The processes described above may be implemented by a system. In one embodiment the system includes a first unit to provide a viewer's preferred channel list and a second unit that interfaces (for example, through a cable system or over the air in the case of a satellite system) with the first unit to provide for inserting into the viewer's preferred channel list a channel not selected based on the predetermined criteria related to the viewing preference of the viewer. In one embodiment, the first unit is included in a set-top box. In one embodiment, the first unit is included in a television. In one embodiment, the first unit is a set-top box and the second unit is a computer system (e.g., a server). In one embodiment, the first unit is a television and the second unit is a computer system (e.g., a server). In one embodiment, the first unit is located remotely from the second unit. In one embodiment, the channel not selected based on the predetermined criteria related to the viewing preference of the viewer is selected by a system operator. In one embodiment, the second unit is further to disallow insertion upon determining that a number of channels not selected based on the predetermined criteria related to the viewing preference of the viewer that have been inserted into the viewer's preferred channel list is greater than a predetermined number. In one embodiment the channel not selected based on the predetermined criteria related to the viewing preference of the viewer is set to expire once a time limit has been reached. In one embodiment, the channel not selected based on the predetermined criteria related to the viewing preference of the viewer is selected from a set of channels that includes channels having at least a predetermined frequency in channels lists of other viewers in the viewer's geographic location. In one embodiment, the channel not selected based on the predetermined criteria related to the viewing preference of the viewer is selected from a set of channels based on a predetermined subject matter. In one embodiment, the predetermined subject matter may be subject matter selected by a viewer. In one embodiment, the predetermined subject matter may be subject matter equivalent to the subject matter found on channels that a viewer frequently watches.

The embodiments described above can be implemented using software in a TV viewing system. Such a TV viewing system can be implemented in many ways. A typical approach to implementation uses a set-top box that contains, among other things, a CPU, storage (e.g., RAM, ROM, etc.), a receiving network adapter, and circuitry to drive a viewing system such as a TV, monitor, projector, etc. All of these elements are not necessarily shown, but are well know in the art. For purposes of the embodiments described below, any other grouping, such as a TV with a built-in CPU, or a personal computer with TV capabilities are considered to be equivalent. Such television viewing system are typically supplied with TV content by system operators, including but not limited to cable provider/operators, satellite provider/operators, broadcasters, overbuilders, etc.

The method and apparatus disclosed herein may be integrated into advanced Internet- or network-based knowledge systems as related to information retrieval, information extraction, and question and answer systems. The system has a processor coupled to a bus. Also coupled to the bus are a memory which may contain instructions. Additional components coupled to the bus are a storage device (such as a hard drive, floppy drive, CD-ROM, DVD-ROM, etc.), an input device (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

Although the present invention has been described with reference to specific exemplary embodiments, it will be evident that various modifications and changes may be made to these embodiments without departing from the broader spirit and scope of the invention. One skilled in the art will appreciate that the embodiments described above apply also to satellite and internet and telephone systems as well as the cable systems described. Accordingly, the specification and drawings are to be regarded in an illustrative rather than a restrictive sense.

What is claimed is:

1. A method comprising:
    receiving input at a television recipient device corresponding to a plurality of user-preferred television channels;
    storing said plurality of user-preferred television channels in a favorite channels list at the television recipient device;
    receiving, via a television programming provider, data corresponding to an additional television channel not in the plurality of user-preferred television channels; and
    inserting the additional television channel into the favorite channels list stored at the television recipient device, such that the additional television channel will be available to users of the television recipient device by accessing the favorite channels list.

2. The method of claim 1, wherein the additional television channel is selected by a system operator.

3. The method of claim 1, wherein inserting the additional television channel into the favorite channels list comprises verifying that a number of television channels in the favorite channels list that are not in the plurality of user-preferred television channels is less than a predetermined number.

4. The method of claim 3, wherein the verifying comprises verifying that the percentage of television channels in the favorite channels list that are not in the plurality of user-preferred television channels does not exceed a predetermined percentage.

5. The method of claim 1, further comprising setting an expiration time for the additional television channel in the favorite channels list, such that the additional television channel will be removed from the favorite channels list once the expiration time has been reached.

6. The method of claim 1, wherein the additional television channel inserted into the favorite channels list comprises a television channel selected from a set of television channels having at least a predetermined frequency in channels lists of other television recipient devices in the same geographic region as the television recipient device.

7. The method of claim 1, wherein the additional television channel inserted into the favorite channels list comprises a television channel selected based on a predetermined subject matter.

8. A machine-readable medium that provides instructions that, when executed by a machine, cause the machine to perform a method comprising:
    receiving input at a television recipient device corresponding to a plurality of user-preferred television channels;
    storing said plurality of user-preferred television channels in a favorite channels list at the television recipient device;
    receiving, via a television programming provider, data corresponding to an additional television channel not in the plurality of user-preferred television channels; and
    inserting the additional television channel into the favorite channels list stored at the television recipient device, such that the additional television channel will be available to users of the television recipient device by accessing the favorite channels list.

9. The machine-readable medium of claim 8, wherein the additional television channel is selected by a system operator.

10. The machine-readable medium of claim 8, wherein inserting the additional television channel into the favorite channels list comprises verifying that a number of television channels in the favorite channels list that are not in the plurality of user-preferred television channels is less than a predetermined number.

11. The machine-readable medium of claim 8, the method further comprising setting an expiration time for the additional television channel in the favorite channels list, such that the additional television channel will be removed from the favorite channels list once the expiration time has been reached.

12. The machine-readable medium of claim 8, wherein the additional television channel inserted into the favorite channels list comprises a television channel selected from a set of television channels having at least a predetermined frequency in channels lists of other television recipient devices in the same geographic region as the television recipient device.

13. The machine-readable medium of claim 8, wherein the additional television channel inserted into the favorite channels list comprises a television channel selected based on a predetermined subject matter.

14. A system comprising:
a television recipient device configured to:
receive input corresponding to a plurality of user-preferred television channels;
store said plurality of user-preferred television channels in a favorite channels list;
receive, via a television programming provider, data corresponding to an additional television channel not in the plurality of user-preferred television channels; and
insert the additional television channel into the favorite channels list, such that the additional television channel will be available to users of the television recipient device by accessing the favorite channels list.

15. The system of claim 14, wherein the additional television channel is selected by a system operator.

16. The system of claim 14, wherein the television recipient device is further configured to verify that a number of television channels in the favorite channels list that are not in the plurality of user-preferred television channels is less than a predetermined number.

17. The system of claim 16, wherein the television recipient device is further configured to verify that the percentage of television channels in the favorite channels list that are not in the plurality of user-preferred television channels does not exceed a predetermined percentage.

18. The system of claim 14, wherein the television recipient device is further configured to set an expiration time for the additional television channel in the favorite channels list, such that the additional television channel will be removed from the favorite channels list once the expiration time has been reached.

19. The system of claim 14, wherein the additional television channel is selected from a set of television channels having at least a predetermined frequency in channels lists of other television recipient devices in the same geographic region as the television recipient device.

20. The system of claim 14, wherein the additional television channel is selected based on a predetermined subject matter.

* * * * *